United States Patent [19]

Mizutani

[11] Patent Number: 5,004,265

[45] Date of Patent: Apr. 2, 1991

[54] SUSPENSION SYSTEM

[75] Inventor: Yoich Mizutani, Kanagawa, Japan

[73] Assignee: Tokico Ltd., Kanagawa, Japan

[21] Appl. No.: 409,095

[22] Filed: Sep. 19, 1989

[30] Foreign Application Priority Data

Sep. 20, 1988 [JP] Japan .................. 63-235400

[51] Int. Cl.⁵ .............................. B60G 17/00
[52] U.S. Cl. .................. 280/707; 280/840; 280/702
[58] Field of Search ............. 280/707, 702, 709, 840

[56] References Cited

U.S. PATENT DOCUMENTS 4,718,695  1/1988  Kawagoe ...................... 280/707
4,813,705  3/1989  Hagen et al. ................. 280/707
4,853,860  8/1989  Achenbach .................... 280/707

Primary Examiner—Richard A. Bertsch
Attorney, Agent, or Firm—Wenderoth, Lind & Ponack

[57] ABSTRACT

A suspension system effects attitude control of a vehicle by supplying and discharging a pressure fluid to and from a suspension unit disposed between the body of the vehicle and a wheel. The suspension system employs a variable displacement pump to constitute a pressure source for supplying a pressure fluid to the suspension unit and controls the pump by a control mechanism such that the discharge of the pump is maintained at a substantially constant level, thereby enabling the load applied to the engine of the vehicle to be maintained at a substantially constant level, and thus achievinhg an increase in output of the engine.

5 Claims, 4 Drawing Sheets

SUSPENSION SYSTEM

BACKGROUND OF THE INVENTION

1. Field of the Invention

The present invention relates to a suspension system designed to effect attitude control of a vehicle.

2. Description of the Prior Art

In suspension systems which are capable of attitude control of vehicles, for example, in active suspensions, a pressure fluid is properly supplied to and discharged from a cylinder of a suspension unit to control the level of the vehicle and suppress the change in the attitude of the vehicle caused by rolling or the like during running, i.e. travel or movement along a road surface and a pressure source is provided to supply the pressure fluid to the suspension unit.

One example of this type of conventional suspension system is shown in FIG. 1.

The prior art suspension system comprises a suspension unit 1 and a pressure source 2 for supplying a pressure fluid to the suspension unit 1. The suspension unit 1 is comprised of: a cylinder 3 which moves a wheel (not shown) relative to a car body (not shown) to thereby raise or lower the level of the vehicle; a control valve 7 which supplies and discharges the pressure fluid to and from the cylinder 3 by properly switching connections to and from two lines, that is, a supply line 4 for supplying the pressure fluid from the pressure source 2 to the cylinder 3 and a return line 5 for returning the pressure fluid from the cylinder 3 to a reservoir (tank) 6, thereby effecting attitude control of the vehicle; an accumulator 8 which is connected to the cylinder 3 to function as a spring element; and a damping force generating mechanism 9 which is provided between the cylinder 3 and the accumulator 8 to generate damping force. The control valve 7 is a solenoid-operated three-port and three-position switching valve which is arranged such that, at the position a, the pressure fluid is supplied to the cylinder 3 from the pressure source 2 to raise the level of the vehicle; at the position b, the pressure fluid is returned from the cylinder 3 to the reservoir 6 to lower the level of the vehicle; and at the position c, which is a neutral position, neither supply nor discharge of the pressure fluid is carried out. It should be noted that the amount of pressure fluid which is to be supplied to or discharged from the cylinder 3 is determined by the time during which the control valve 7 is open or the degree of opening of the valve 7.

The pressure source 2 is comprised of: a fixed displacement pump 11 which is activated in response to the rotation of an engine E of the vehicle to dischage under pressure fluid drawn from the reservoir 6 through a line 10; an accumulator 13 which is provided along a line 12 which connects together the fixed displacement pump 11 and the supply line 4 of the suspension unit 1 to accumulate the pressure fluid; a check valve 14 for preventing the pressure fluid from flowing backward from the accumulator 13 toward the fixed displacement pump 11; and a control mechanism 15 which effects constant flow control to supply the pressure fluid at a predetermined flow rate indenpendently of the rotational speed of the engine E and which also effects unloading control to return the pressure fluid discharged from the fixed displacement pump 1 to the reservoir 6 when the pressure of the pressure fluid supplied to the suspension unit 1 has reached a predetermined value.

The constant flow control that is effected by the control mechanism 15 is realized by a mechanism which comprises a restrictor 16 provided along the line 12 and a two-port and two-position flow control valve 18 provided in a line 17 which connects together the line 10 and the side of the restrictor 16 which is closer to the fixed displacement pump 11 so that, when the difference between the pressures of the pressure fluid at the upstream and downstream sides of the restrictor 16 exceeds a predetermined value, the flow control valve 18 is activated to return a part of the pressure fluid discharged from the fixed displacement pump 11 to the line 10.

The unloading control is effected by means of a two-port and two-position switching valve 20 provided in a line 19 which connects together the line 12 and the return line 5 in such a manner that, when the pressure of the pressure fluid between the check valve 14 and the suspension unit 1 has reached a predetermined value, the switching valve 20 is switched so as to return the pressure fluid discharged from the fixed displacement pump 11 to the reservoir 6.

It should be noted that the reference symbol R in FIG. 1 denotes a relief valve which is provided to return the pressure fluid to the line 10 when the pressure of the pressure fluid rises abnormally because, for example, of a breakage of the switching valve 20 that effects the unloading control. The reference symbol C in FIG. 1 denotes a cooling pipe which is provided to cool the pressure fluid which has been raised in temperature by being compressed in the oil hydraulic circuit.

The following is a description of the operation of the above-described conventional suspension system.

As the engine E starts rotating, the fixed displacement pump 11 is activated to suck the fluid from the reservoir 6 and discharge it toward the suspension unit 1, and the pressure fluid is accumulated in the accumulator 13. As the rotational speed of the engine E increases, the flow rate of the pressure fluid discharged from the fixed displacement pump 11 increases correspondingly and the difference between the pressures of the pressure fluid at the upstream and downstream sides of the restrictor 16 also increases. When the pressure difference exceeds a predetermined value, the flow control valve 18 is activated to return a part of the pressure fluid discharged from the fixed displacement pump 11 to the line 10 through the line 17, thus allowing the pressure fluid to be supplied to the suspension unit 1 only at a predetermined flow rate. When the pressure of the pressure fluid supplied to the suspension unit 1 has reached a predetermined value, the switching valve 20 is switched so as to pass the pressure fluid to the return line 5 through the line 19, thus effecting unloading control.

The above-described conventional suspension system suffers, however, from the following problems.

The fixed displacement pump 11 continuously repeats the suction, compression and discharge of the fluid from the starting of the engine E, and the discharge of the pump 11 increases in proportion to the rotational speed of the engine E. On the other hand, the amount of oil which is to be supplied to and discharged from the suspension unit 1, that is, the amount of oil consumed, is not directly related to the rotational speed of the engine E but is limited within a predetermined range, and the displacement volume of the fixed displacement pump 11 is set so that the amount of oil required can be ensured near the lowest speed of the engine E. Therefore, when the engine E rotates at high speed, the discharge of the fixed displacement pump 11 also increases in proportion to the rotational speed of the engine E and the pump 11 repeats suction, compression and discharge of the fluid in excess of the amount of oil required, thus imposing a heavy load on the engine E. In addition, an excess of the oil discharged is returned to the line 10 by the constant flow control effected by the flow control valve 18, which means that the fixed displacement pump 11 performs wasteful work.

In the unloading control, the oil that is discharged from the fixed displacement pump 11 is returned to the reservoir 6 through the switching valve 20 and the line 19 and therefore the pump 11 produces substantially no load. For this reason, when the fixed displacement pump 11 repeats the ordinary compressing operation and the unloading control operation while the engine E is rotating at high speed, the load applied to the engine E varies by a large margin, resulting in a shock every time the compressing operation and the unloading control operation are switched over from the one to the other, and thus causing an uncomfortable ride for the driver.

SUMMARY OF THE INVENTION

In view of the above-described problems of the prior art, it is a primary object of the present invention to provide a suspension system which is designed so that the discharge of the pump is maintained at a substantially constant level irrespective of the increase in the rotational speed of the engine.

To this end, the present invention provides a suspension system designed to effect attitude control of a vehicle by supplying and discharging a pressure fluid to and from a suspension unit disposed between a body of a vehicle and a wheel thereof, comprising: a pressure source for supplying the pressure fluid to the suspension unit; a variable displacement pump activated in response to the rotation of an engine of the vehicle, the displacement volume of the pump being controllable; and a control mechanism having a restrictor provided in a line connected to the discharge side of the variable displacement pump to effect control such that, when the difference between the pressures of the pressure fluid at the upstream and downstream sides of the restrictor is greater than a predetermined value, the displacement volume of the pump is reduced so as to maintain the discharge of the pump at a substantially constant level.

By virtue of the above-described arrangement, when the difference between the pressures of the pressure fluid at the upstream and downstream sides of the restrictor provided in the line connected to the discharge side of the variable displacement pump increases due to the high-speed rotation of the engine, the displacement volume of the pump is reduced to effect constant flow control such that the discharge of the pump is maintained at a substantially constant level, thus enabling the load applied to the engine to be maintained at a substantially constant level.

BRIEF DESCRIPTION OF THE DRAWINGS

The above and other objects, features and advantages of the present invention will become more apparent from the following description of a preferred embodiment thereof, taken in conjunction with the accompanying drawings, in which like reference numerals denote like elements, and in which.

DESCRIPTION OF THE PREFERRED EMBODIMENT

Figure 1:
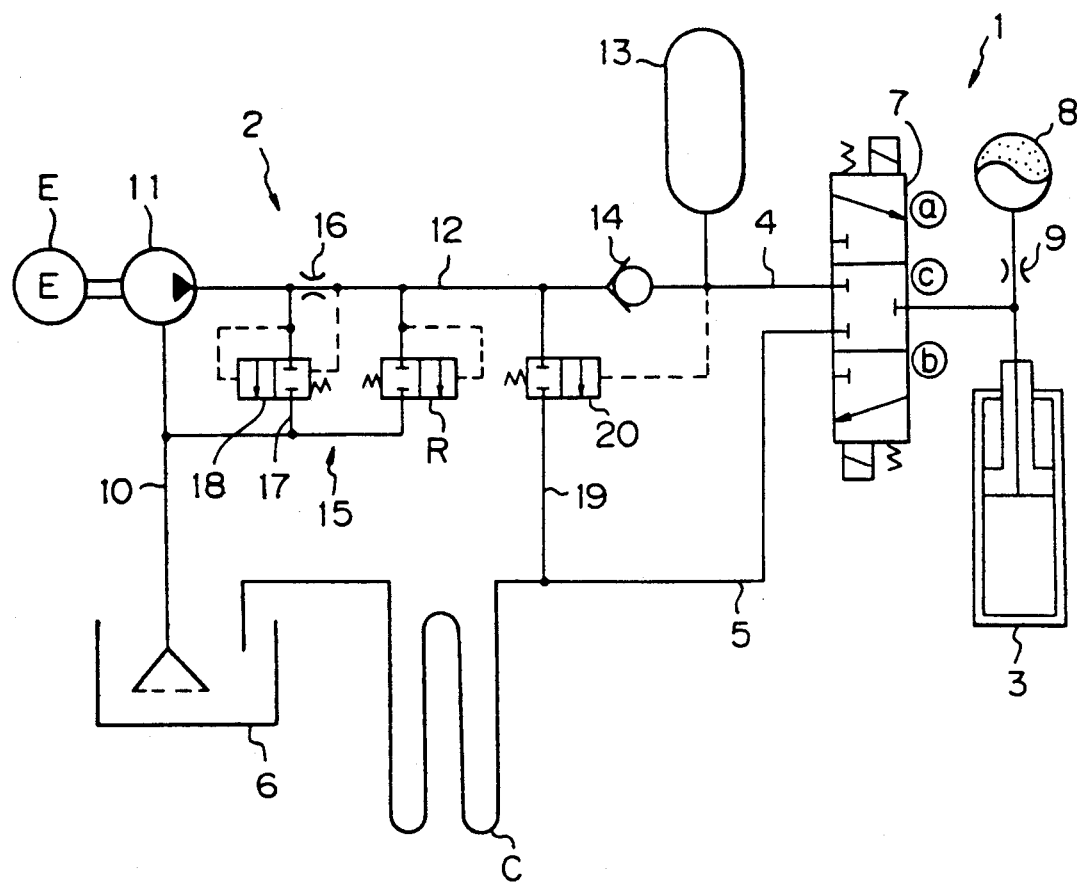
FIG. 1 is a schematic view showing the arrangement of a conventional suspension system.
Figure 2:
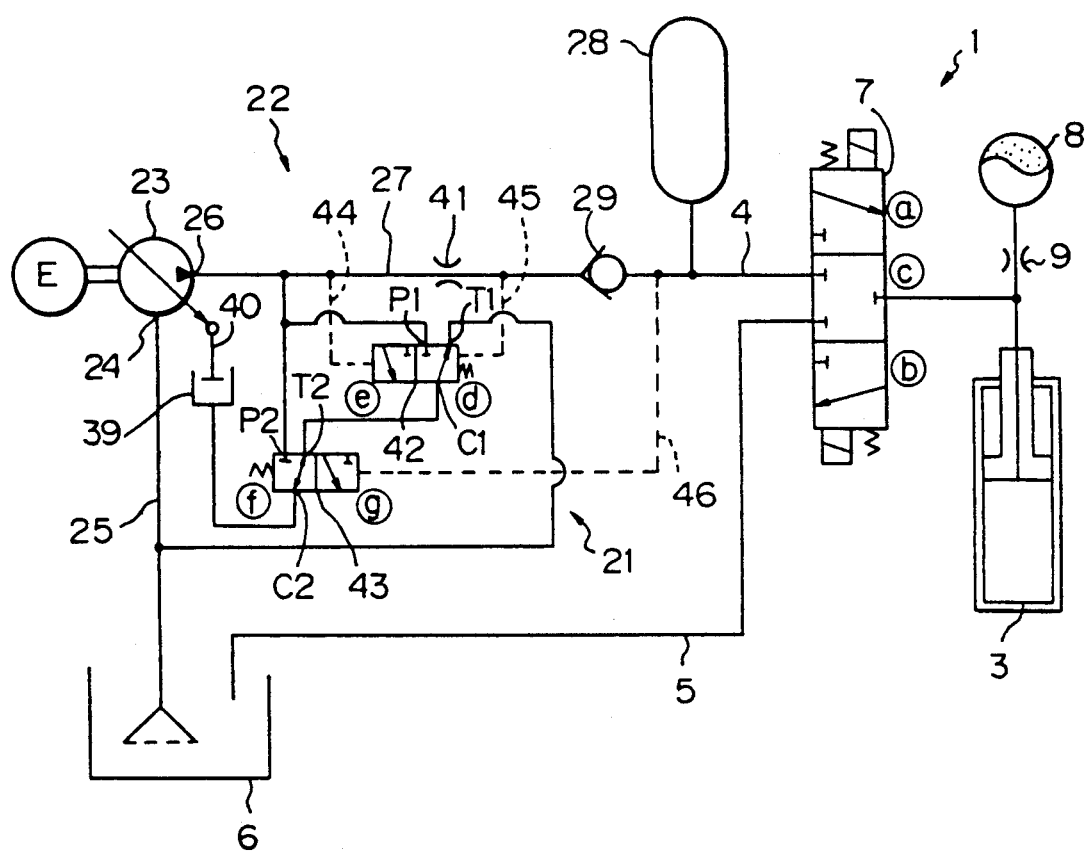
FIG. 2 is a schematic view showing the arrangement of one embodiment of the suspension system according to the present invention.

One embodiment of the present invention will be described below in detail with reference to FIGS. 2 to 4. Since the suspension unit in this embodiment is the same as that described in connection with the prior art, it is denoted by the same reference numeral, i.e. 1, and description thereof is omitted. The pressure source 22 of this embodiment has a control mechanism 21 that will be explained below in detail.

A variable displacement pump 23 discussed in detail below is connected to an engine E of a vehicle so that the pump 23 is activated in response to rotation of the engine E. A line 25 for withdrawing a fluid (oil) from a reservoir 6 is connected to a suction port 24 of the pump 23, and a line 27 for supplying a pressure fluid to the suspension unit 1 is connected to a discharge port 26 of the pump 23. The line 27 is provided with an accumulator 28 for accumulating the pressure fluid and a check valve 29 for preventing the pressure fluid from flowing backward from the accumulator 28 toward the variable displacement pump 23.

One example of the variable displacement pump 23 will next be explained with reference to FIGS. 3 and 4.

Inside a pump body 30, a shaft 31 is rotatably supported by bearings 32 and 33, the shaft 31 being coupled to the rotary shaft of the engine E so that the rotation of the engine E is transmitted to the shaft 31. A cylinder body 34A is coupled to the shaft 31 in such a manner that the cylinder body 34A is axially movable relative to the shaft 31 and rotatable together with it in the direction of rotation. The cylinder body 34A has a plurality of pump cylinders 34 spaced apart from each other in the circumferential direction. Each pump cylinder 34 has a pump piston 35 slidably fitted therein. One end of the pump piston 35 has a spherical configuration. The spherical end of the pump piston 35 is received in a spherical recess 36a which is formed in a sliding member 36. The spherical end of the pump piston 35 is slidable and rotatable within the recess 36a but incapable of disengaging therefrom.

In addition, a tilting member 37 is provided in the body 30. The tilting member 37 is supported by a pair of hemispherical members 38 in such a manner that the angle of relative inclination thereof is variable, the hemispherical members 38 being provided at both sides, respectively, of the shaft 31 such that the members 38 face each other in a direction perpendicular to the paper surface or plane of the drawing. The angle of tilt of the tilting member 37 is variable in response to the movement of a piston 40 which is slidably fitted in a cylinder 39 formed in the body 30. Each sliding member 36 abuts an inclinable surface of the tilting member 37 such that the sliding member 36 is slidable thereon in the circumferential direction. As the shaft 31 rotates, the sliding member 36 revolves circumferentially on the surface of the tilting member 37, thus causing the pump pistons 35 to repeat axial reciprocating motion within the pump cylinders 34.

Figure 3:
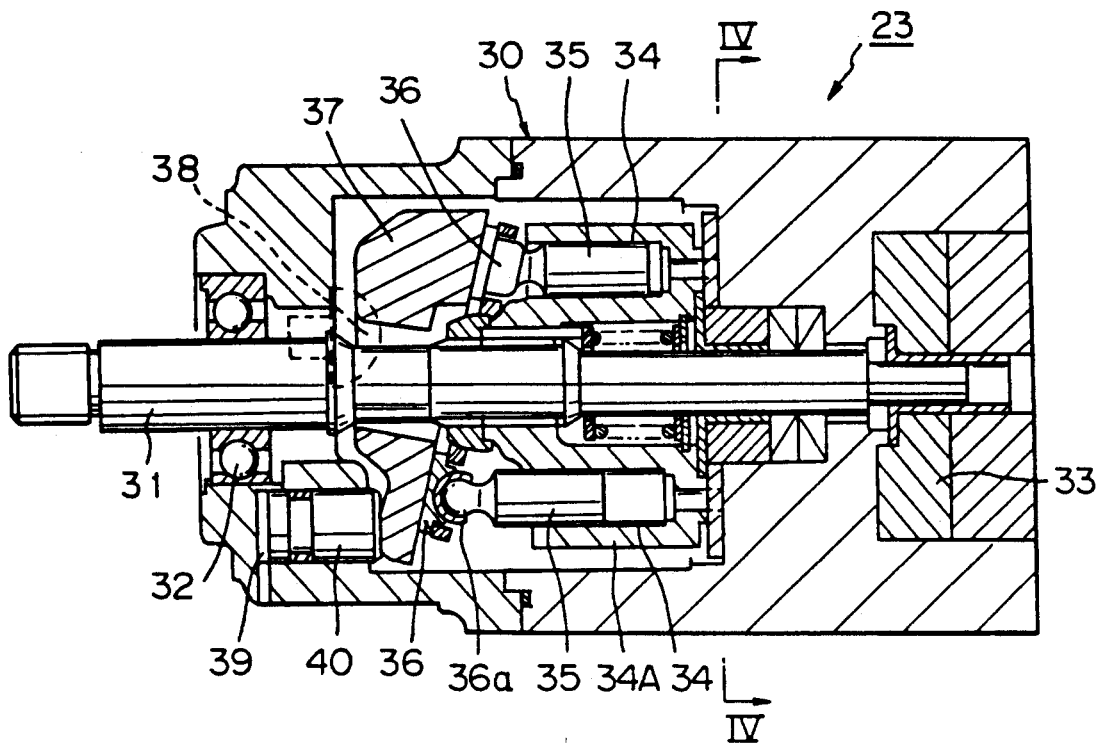
FIG. 3 is a longitudinal sectional view of one example of a variable displacement pump employed in the present invention.
Figure 4:
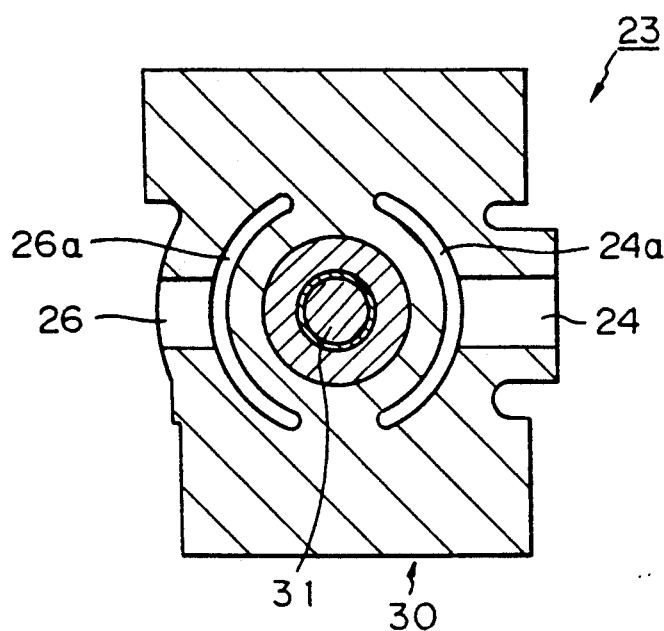
FIG. 4 is a sectional view taken along the line IV—IV of FIG. 3.

It should be noted that the tilting member 37 is movable from a position where the surface of the tilting member 37 on which the sliding member 36 slide is inclined as shown in FIG. 3 to a position where such surface of the tilting member 37 is perpendicular to the axis of shaft 31, but further movement of the tilting member 37 is prevented by a stopper means (not shown).

The cylinder 39 is also provided with a restricting passage (not shown) for releasing a quite small portion of the pressure fluid in the cylinder 39 to the suction port 24 when the piston moves to a position so that the inclined face of the tilting member 37 extends nearly perpendicular, for example by about 89 degrees, to the axis of the shaft 31. The restricting passage functions to maintain the pressure in the cylinder 39 at a predetermined level during unloading control, which will be explained hereinafter, by releasing a small amount of pressure fluid discharged by the variable displacement pump 23 to the suction port 24.

With this arrangement, when each pump piston 35 moves in a direction to extend from its cylinder 34, the pressure fluid is sucked into the pump cylinder 34 from a semicircular groove 24a formed in the suction port 24, whereas, when the pump piston 35 moves in a direction in which it contracts into its cylinder 34, the pressure fluid is discharged from the pump cylinder 34 through a semicircular groove 26a formed in the discharge port 26. In this way, a pumping action is performed.

The following is a description of the control mechanism 21 that performs constant flow control and unloading control.

Returning to FIG. 2, a restrictor 41 is disposed in the line 27 that is connected to the discharge side of the variable displacement pump 23. There is also provided a three-port and two-position flow control valve 42 which is activated in accordance with the difference between the pressures of the pressure fluid at the upstream and downstream sides of the restrictor 41. Among the three ports of the flow control valve 42, a pump port P1 is connected to the line 27 on the discharge side of the variable displacement pump 23, a tank port T1 is connected to the line 25 on the suction side of the pump 23, and second cylinder port C1 is connected to a tank port T2 of a switching valve 43 for unloading control (described below). When the flow control valve 42 is at the position d, the cylinder port C1 and the tank port T1 are communicated with each other, whereas, when the valve 42 is at the position e, the pump port P1 and the cylinder port C1 are communicated with each other.

The switching valve 43 that is provided to perform unloading control on the basis of the level of pressure of the pressure fluid between the check valve 29 and the suspension unit 1 is a three-port and two-position switching valve. Among the three ports of the valve 43, a pump port P2 is connected to the line 27 on the discharge side of the variable displacement pump 23, the tank port T2 is connected to the cylinder port C1 of the flow control valve 42, and the cylinder port C2 is connected to the cylinder 39 that is formed in the body 30 of the variable displacement pump 23. When the switching valve 43 is at the position f, the tank port T2 and the cylinder port C2 are communicated with each other, whereas, when the valve 43 is at the position g, the pump port P2 and the cylinder port C2 are communicated with each other.

It should be noted that lines 44, 45 and 46 shown by dashed lines are pilot lines whereby the flow control valve 42 is properly switched in accordance with the level of pressure detected or present in the pilot lines 44, and 45, and switching valve 43 is properly switched in accordance with the level of pressure detected, or present in pilot line 46.

The operation of the suspension system having the above-described arrangement will next be explained.

As the engine E starts rotating, the operation of the variable displacement pump 23 is started. At the time of starting, the flow control valve 42 and the switching valve 43 are in the respective positions shown in FIG. 2. Therefore, the pressure fluid sucked from the reservoir 6 by the operation of the pump 23 is discharged toward the suspension unit 1 and accumulated in the accumulator 28.

When attitude control of the vehicle is executed, the control valve 7 is properly switched to supply or discharge the pressure fluid to or from the cylinder 3.

Figure 5:
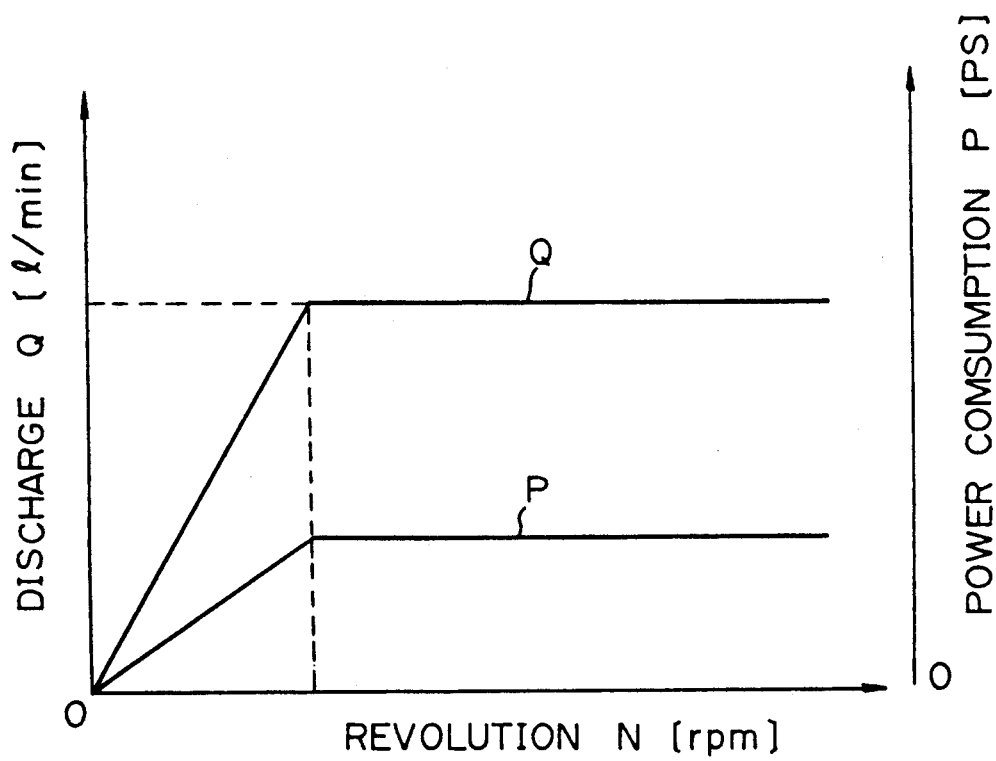
FIG. 5 is a graph showing the relationship between the revalutions or speed of an engine connected to the pump, the discharge of the pump and the power consumption of the engine.

As the rotational speed of the engine E rises, the discharge of the variable displacement pump 23 increases correspondingly. In such a case, however, a large pressure difference is produced between the upstream and downstream sides of the restrictor 41 and this causes the flow control valve 42 to move in the direction in which it is switched over from the position d to the position e. As a result, some of the pressure fluid discharged from the pump 23 is introduced into the cylinder 39 in the pump 23 through the pump port P1 and the cylinder port C1, and the tank port T2 and the cylinder port C2 causing the tilting member 37 to move in the direction in which the angle of inclination thereof decreases, and thus reducing the displacement volume so that the increased discharge of the pump 23 is returned to a predetermined level. When the pressure difference between the upstream and downstream sides of the restrictor 41 has decreased to a predetermined value as a result of lowering the discharge of the pump 23, the flow control valve 42 moves in a direction from the position e toward the position d by an amount sufficient to cut off communication between the pump port P1 and the cylinder port C1. As a result, the introduction of the pressure fluid into the cylinder 39 in the variable displacement pump 23 is suspended and hence a predetermined displacement volume is maintained. If in this state the rotational speed of the engine E lowers, the discharge of the variable displacement pump 23 decreases and the pressure difference between the upstream and downstream sides of the restrictor 41 further decreases correspondingly. As a result, the flow control valve 42 further moves in the direction in which it is switched over from the position e to the position d, thereby bringing the cylinder port C1 and the tank port T1 into communication with each other, and thus returning to the reservoir 6 a part of the pressure fluid previously introduced into the cylinder 39 in the variable displacement pump 23. In consequence, the tilting member 37 moves in the direction in which the angle of inclination thereof increases, thus increasing the displacement volume of the pump 23 so that the previously reduced discharge of the pump 23 is returned to a predetermined increased level. In this way, the flow control valve 42 is properly switched in accordance with the difference between the pressures of the pressure fluid at the upstream and downstream sides of the restrictor 41, thus enabling the pressure fluid to be supplied to the suspension unit 1 from the pump 23 at a substantially constant flow rate. FIG. 5 shows the relationship explained above between the members of revalutions N of the engine E, the discharge Q of the variable displacement pump 23 and the power consumption P of the engine E.

When the pressure of the fluid accumulated in the accumulator 28 exceeds a predetermined value, the switching valve 43 is switched over from the position f to the position g. As a result, some of the pressure fluid discharged from the variable displacement pump 23 is supplied into the cylinder 39 in the pump 23 to move the tilting member 37 so that the surface on which the sliding member 36 slides extends nearly perpendicular to the axis of the shaft 31. In consequence, the piston 35 is brought into such a condition that it only slightly moves in the axial direction when it revolves. Thus, the variable displacement pump 23 sucks and discharges the pressure fluid only to such an extent that the pressure in the cylinder 39 is maintained at a predetermined level.

Thus, it is possible to maintain the load applied to the engine E at a substantially constant level by maintaining the flow rate of the pressure fluid discharged from the variable displacement pump at a substantially constant level when constant flow control is effected and by making the displacement volume a predetermined minimum value when unloading control is effected.

Although this embodiment employs the variable displacement pump 23 in which the displacement volume is varied by means of the tilting member 37, it should be noted that the present invention is not necessarily limited thereto and that it is also possible to employ other types of pump in which the displacement volume can be varied by use of the pressure of a pressure fluid, for example, a vane pump.

As has been described in detail above, the present invention employs a variable displacement pump to constitute a pressure source for supplying a pressure fluid to a suspension unit and controls the pump by a control mechanism such that the discharge of the pump is maintained at a substantially constant level, thereby enabling the load applied to the engine to be maintained at a substantially constant level, and thus achieving an increase in outputs of the engine.

Since variation in the load applied to the engine is maintained within a small range even when the variable displacement pump repeats the ordinary compressing operation and the unloading control operation while the engine is rotating at high speed, the shock that is generated when the compressing operation and the unloading control operation are switched over from the one to the other is small and substantially the same as that generated when the engine is rotating at low speed. Thus, there is no danger that such shock will cause the driver discomfort.

Although the present invention has been described in specific terms, it should be noted here that the described embodiment is not necessarily exclusive and that various changes and modifications may be imparted thereto without departing from the scope of the invention which is limited solely by the appended claims.

What is claimed is:

1. In a suspension system designed to effect attitude control of a vehicle and including a suspension unit to be disposed between a vehicle body and a wheel and adapted to receive and discharge a pressure fluid to effect said attitude control and a pressure source mechanism including a reservoir and a pump for supplying the pressure fluid to said suspension unit from said reservoir, the improvement wherein:

said pump comprises a variable displacement pump adapted to be activated in response to the rotation of an engine of the vehicle, the displacement volume of said pump being controllable; and said pressure source mechanism further comprising a control mechanism having a restrictor provided in a line connected to a discharge side of said variable displacement pump to effect control such that, when a difference between the pressure of the pressure fluid at upstream and downstream sides of said restrictor is greater than a predetermined value, said displacement volume of said pump is reduced so as to maintain the discharge of said pump at a substantially constant level.

2. A suspension system according to claim 1, wherein said control mechanism comprises means for causing said displacement volume of said variable displacement pump to be at a predetermined minimum value when the pressure of the pressure fluid to be supplied to said suspension unit has reached a predetermined value, thus effecting unloading control.

3. A suspension system according to claim 2, wherein said variable displacement pump includes a pump cylinder attached to a shaft to be rotated in response to rotation of the vehicle engine, said pump cylinder being eccentric with respect to the axis of said shaft, a pump piston reciprocatably received in said pump cylinder, one end of said pump piston extending outside said pump cylinder, a tilting member having an inclined surface facing said pump cylinder, and a sliding member rotatable with said shaft and slidable along said inclined surface, said one end of said pump piston being connected to said sliding member so that, as said shaft rotates, said pump piston performs a reciprocating motion with respect to said pump cylinder, said control mechanism controlling the angle of inclination of said inclined surface with respect to the axis of said shaft by activating said tilting member.

4. A suspension system according to claim 3, wherein said variable displacement pump further includes a piston having a first end abutting against said tilting member and a cylinder reciprocatably receiving said piston, said control mechanism controlling the angle of inclination of said tilting member by supplying and discharging the pressure fluid to and from said cylinder.

5. A suspension mechanism according to claim 4, wherein said control mechanism includes a flow control valve the position of which is changed in accordance with said difference between said pessures of the pressure fluid at said upstream and downstream sides of said restrictor such that, when said pressure difference is greater than a predetermined value, the pressure fluid is introduced into said cylinder in said variable displacement pump to reduce said displacement volume of said pump, whereas, when said pressure difference is smaller than said predetermined value, the pressure fluid is discharged from said cylinder to increase said displacement volume of said pump.

* * * * *